United States Patent
Tang Kok Meng et al.

(10) Patent No.: US 11,437,071 B2
(45) Date of Patent: Sep. 6, 2022

(54) MULTI-SESSION CONCURRENT TESTING FOR MULTI-ACTUATOR DRIVE

(71) Applicant: Seagate Technology LLC, Cupertino, CA (US)

(72) Inventors: Fabian Tang Kok Meng, Singapore (SG); Zhixing Chen, Singapore (SG); Song Liqin, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 594 days.

(21) Appl. No.: 16/551,184

(22) Filed: Aug. 26, 2019

(65) Prior Publication Data
US 2021/0065745 A1  Mar. 4, 2021

(51) Int. Cl.
G11B 27/36 (2006.01)
G11B 20/18 (2006.01)
G11B 19/04 (2006.01)
G06F 11/36 (2006.01)

(52) U.S. Cl.
CPC ...... *G11B 20/1816* (2013.01); *G06F 11/3688* (2013.01); *G06F 11/3692* (2013.01); *G11B 19/048* (2013.01); *G11B 2220/2516* (2013.01)

(58) Field of Classification Search
None
See application file for complete search history.

(56) References Cited

U.S. PATENT DOCUMENTS

| | | | | |
|---|---|---|---|---|
| 4,773,094 A | * | 9/1988 | Dolby | G11B 27/36 381/98 |
| 4,870,643 A | | 9/1989 | Bultman et al. | |
| 5,223,993 A | | 6/1993 | Squires et al. | |
| 5,293,282 A | | 3/1994 | Squires et al. | |
| 5,355,486 A | | 10/1994 | Cornaby | |
| 6,332,203 B1 | * | 12/2001 | Tanaka | G11B 25/043 |
| 6,678,120 B2 | | 1/2004 | Money | |
| 7,100,027 B1 | * | 8/2006 | Padwekar | G06F 11/3688 712/228 |
| 7,102,842 B1 | | 9/2006 | Howard | |

(Continued)

OTHER PUBLICATIONS

Tom's Hardware Seagate testing, URL: https://www.tomshardware.com/reviews/how-seagate-tests-hard-drives,4408.html 4 pages, accessed Jun. 18, 2019.

(Continued)

*Primary Examiner* — Peter Vincent Agustin
(74) *Attorney, Agent, or Firm* — Kagan Binder, PLLC

(57) ABSTRACT

A method for testing a multiple-actuator storage device includes accessing a first storage device comprising at least a first and a second logical unit and concurrently performing a first group of test operations on the first logical unit and a second group of test operations on the second logical unit. The method includes monitoring for an interruption during the performing the group of test operations on the first or the second logical unit, and during the monitoring, if it is determined that there is an interruption on one of the first or second logical units, performing the respective test operations on the other logical unit is temporarily suspended. The method also includes continuing to monitor for the interruption, and upon determining that the interruption is not currently active, resuming concurrently performing the test operations on the first and second logical units.

20 Claims, 12 Drawing Sheets

(56) References Cited

U.S. PATENT DOCUMENTS

| | | | |
|---|---|---|---|
| 7,710,683 B2 | 5/2010 | Craig et al. | |
| 7,961,435 B2 | 6/2011 | Lee | |
| 8,327,193 B2 | 12/2012 | Enarson et al. | |
| 9,830,939 B1 | 11/2017 | Hamilton | |
| 9,911,442 B1 | 3/2018 | Kharisov et al. | |
| 10,037,779 B1 | 7/2018 | Mendonsa et al. | |
| 10,043,543 B1 | 8/2018 | Buch et al. | |
| 10,049,691 B1 | 8/2018 | Gaertner et al. | |
| 10,192,576 B1 | 1/2019 | Gaertner | |
| 2002/0039259 A1 | 4/2002 | Koyama et al. | |
| 2005/0071117 A1* | 3/2005 | Escobar | G11B 25/043 |
| | | | 702/132 |
| 2007/0061638 A1* | 3/2007 | Nishiuchi | G11B 19/048 |
| | | | 714/718 |
| 2008/0126678 A1* | 5/2008 | Mizushima | G11C 16/349 |
| | | | 711/E12.008 |
| 2009/0083580 A1* | 3/2009 | Postage | G06F 11/2221 |
| | | | 714/34 |
| 2016/0195863 A1* | 7/2016 | Minamiura | G06F 3/0625 |
| | | | 700/20 |
| 2018/0226091 A1 | 8/2018 | Tan et al. | |
| 2021/0065745 A1* | 3/2021 | Tang Kok Meng | G06F 3/0604 |

OTHER PUBLICATIONS

SeaTools for Windows User Guide, Copyright © 2015, 24 pages, Accessed Jun. 17, 2019.

\* cited by examiner

200

| LUN # | TESTED? |
|---|---|
| 0 | YES |

SINGLE ACTUATOR DRIVE
(PRIOR ART)

| LUN # | TESTED? |
|---|---|
| 0 | YES |
| 1 | NO |
| 2 | NO |

MULTI-ACTUATOR DRIVE
(PRIOR ART)

FIG. 2B

MULTI-SESSION CONCURRENT TESTING FOR MULTI-ACTUATOR DRIVE

SUMMARY

This disclosure is generally directed to methods and systems for the testing of multi-actuator hard-disk storage systems. The advent of multi-actuator HDDs has significantly improved I/O throughput for an individual HDD. A multi-actuator HDD can contain two (or more) separate data volumes or logical units, i.e., logical unit numbers (LUNs). By including two or more unique LUNs within a single physical multi-actuator HDD, new challenges arise with respect to drive testing. In particular, there is a need to test a multi-actuator HDD without significantly slowing down the testing process.

HDDs are complex devices that include both mechanical and electronic aspects, among others. As a result, HDDs are sometimes subject to hardware, firmware, or software errors, defects, or other faults. HDDs are typically tested for quality assurance, stress testing, among other aspects. At present, it is common to use test scripts for HDD testing. It is also typical that for a multi-logical unit HDD, which contains multiple logical units, a first logical unit will be tested followed by testing another logical unit in turn. Therefore, presently when testing a multiple-actuator, multiple-logical unit HDD, testing time is multiplied as compared to a single actuator, single logical unit drive. There is therefore a desire to test multiple independent logical units of a single multi-actuator drive in a way where the testing can be performed on the multiple logical units of a multiple actuator HDD concurrently and without significant drawbacks.

Disclosed testing methods and systems involve testing two or more logical units within a single HDD unit concurrently and seamlessly. When one of the logical units (e.g., LUNs) is interrupted during testing, the other logical unit(s) are configured to wait ("sync") until the interruption has cleared, upon which the testing un-syncs and the logical unit can start testing again, for example where testing left off before being interrupted. By doing this, the multiple logical units within a single HDD unit can be tested concurrently, and can also avoid collisions or errors that would currently occur where one logical unit continues testing when the other is interrupted.

According to a first aspect of the present disclosure, a testing system is disclosed. According to the first aspect, the testing system includes a hardware processor operatively coupled to a memory, the memory storing instructions that when executed on the hardware processor generate a storage device unit, a testing unit, and a monitoring unit. According to the first aspect, the storage device unit is configured to interface with a first storage device of one or more multiple-actuator storage devices, the first storage device including at least a first and a second logical unit stored therein. Also according to the first aspect, the testing unit includes a first group of test operations to be performed on the first logical unit and a second group of test operations to be performed on the second logical unit. Also according to the first aspect, the monitoring unit is configured to determine if an interruption occurs while the group of test operations are performed on the first or the second logical unit. Also according to the first aspect, if the monitoring unit determines that there is an interruption, the testing unit temporarily suspends performing the respective test operations on the other logical unit, and the monitoring unit continues to monitor for interruptions. Finally, according to the first aspect, if it is determined that a group of test operation is not currently interrupted, the testing unit proceeding to perform the respective test operations on the first and second logical units.

According to a second aspect of the present disclosure, a method for testing a multiple-actuator storage device is disclosed. According to the second aspect, the method includes accessing a first storage device of a group including at least one storage device, the first storage device including at least a first and a second logical unit stored therein. The method also includes concurrently performing a first group of test operations on the first logical unit and a second group of test operations on the second logical unit. The method also includes monitoring for an interruption during the performing the group of test operations on either the first or the second logical unit. Also according to the second aspect, during the monitoring, if it is determined that there is currently an interruption on one of the first or second logical units, performing the respective test operations on the other logical unit is temporarily suspended. The method also includes continuing to monitor for the interruption, and upon determining that the interruption is not currently active, resuming concurrently performing the test operations on the first and second logical units according to the respective groups of test operations.

According to a third aspect of the present disclosure, another method for testing a multiple-actuator storage device is disclosed. According to the third aspect, the method includes accessing a first storage device including at least a first and a second logical unit stored therein. The method also includes concurrently performing a first group of test operations on the first logical unit and a second group of test operations on the second logical unit. The method also includes determining that there is currently an interruption during the performing the group of test operations on either the first or the second logical unit. According to the third aspect, in response to the determining that there is currently an interruption, performing the respective test operations is temporarily suspended on the other logical unit. The method also includes receiving a resume indication, and resuming concurrently performing the test operations on the first and second logical units according to the respective groups of test operations.

BRIEF DESCRIPTION OF THE DRAWINGS

Other important objects and advantages of the present invention will be apparent from the following detailed description of the invention taken in connection with the accompanying drawings.

FIG. 2A is a table showing which LUNs are tested in a single actuator drive according to existing schemes.

FIG. 2B is a table showing which LUNs are tested in a multi-actuator drive according to existing schemes.

DETAILED DESCRIPTION

Figure 1:
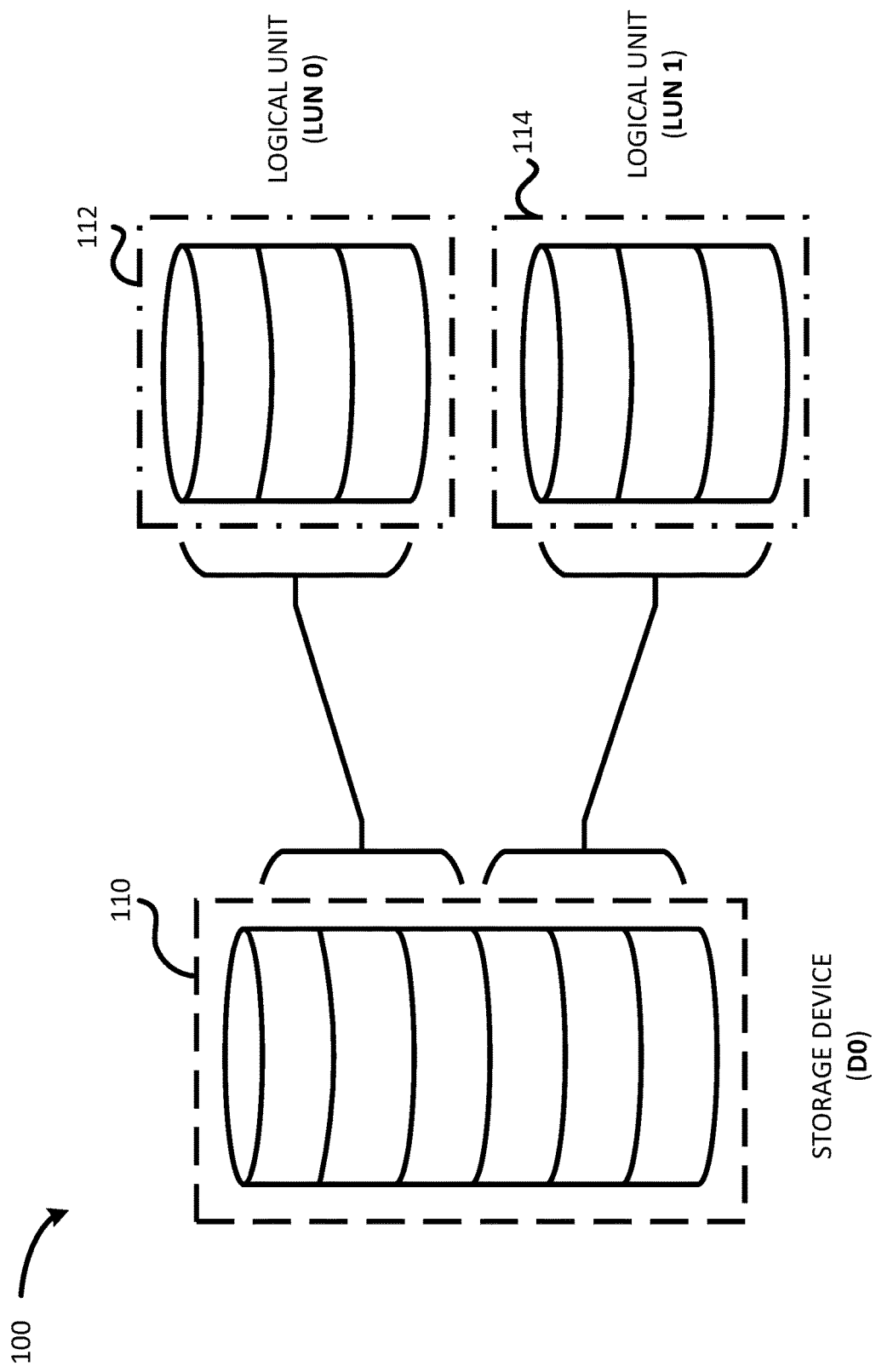
FIG. 1 is a block diagram of a storage system that includes a storage device including at least two logical units, according to various embodiments.

As hard-disk drives (HDDs, or drives) become ever larger in areal density and overall capacity, such as with the advent of heat-assisted magnetic recording (HAMR) technologies, reading, writing, and access latency speeds have become a relatively weak link in modern HDD technology. Therefore, a need exists to improve read, write, and access performance in HDDs (and other storage media).

Multiple-actuator (i.e., multi-actuator) HDDs have significantly improved I/O throughput for an individual HDD. In various embodiments, each multi-actuator HDD contains two (or more) separate logical units, also referred to as logical unit numbers (LUNs). A logical unit number (LUN) is a number used to identify a logical unit, which can be a device addressed by a small-computer system interface (SCSI) protocol or storage area network (SAN) protocol. A LUN can also refer to the logical unit itself. A LUN can be used with any device that supports read/write operations, such as a logical disk created by a SAN. User LUN or LUN space can be LUN or LUN space of a particular user or multiple users. A LUN can include multiple data blocks accessed using, e.g., logical block addressing (LBA) techniques.

Although various embodiments discussed herein refer to the particular example of (e.g., an array of or individual) dual-actuator HDDs, this is merely put forth as one possible example. In other embodiments, storage devices can include one or more HDDs (or any other type of suitable storage device) having more than two actuators (and therefore more than two logical units), or other storage media that employ multiple logical units stored on a single storage device other than HDDs, such as solid-state drives, virtual drives, and the like. For example, HDDs with three, four, five, six, seven, eight, nine, ten, or more actuators and LUNs are contemplated herein. Therefore, disclosed embodiments could be adapted by a skilled artisan to conform to the requirements and parameters of an HDD with three or more actuators.

A multiple-LUN storage device (of which a multiple-actuator HDD is one possible example) includes more than one LUN within a single storage device. This can entail a storage device that acts essentially as if it contained two separate and independent storage devices within a single construct or housing. By including two or more unique LUNs within a single physical multi-actuator HDD, new challenges arise with respect to data management and integrity. In particular, where a single physical HDD contains two LUNs, a single LUN error or fault during testing can also lead to a testing failure of the other LUN of the same physical HDD. In some embodiments the various LUNs of an HDD are stacked as two sets of concentric, but stacked platters. Also in some embodiments, the multiple actuators are also stacked in correspondence to the stacked platters and can all rotate independently but on a same axis of actuator rotation. In other embodiments, the multiple actuators can be rotatable separate from one another and according to a different axis. In yet other embodiments, the multiple LUNs of a multi-actuator HDD can be intermixed according to a virtual disk layer or a physical disk layer.

HDDs typically require at least some testing during or after manufacture, setup, and/or reconfiguration. Test suites are generally used to perform testing operations to HDDs. It takes time to write test suite programs for HDDs. Tests in test suite programs generally have to cater to the needs and characteristics of the particular HDDs, including those that are being tested. Existing test suite programs are frequently re-used on new or different HDDs since most HDD features and characteristics are simply ported over from older products when new HDDs are developed.

Most test suites are run on only a single LUN since older HDDs only have a single actuator. There are typically many test scripts utilized during HDD testing, and re-writing or making major code changes to these test scripts can take significant time and/or programming effort. However, if an existing, single actuator test suite is run on multi-actuator HDD, only one LUN of multiple LUNs of the multi-actuator HDD would be tested at a time without making changes to the test suites.

With the development of multi-actuator HDDs, there is a need to beneficially modify existing test suites or to create new test suites in order to test unique features or attributes of multi-actuator HDDs. One challenge is that, using existing test scripts, all LUNs on multi-actuator (and multi-LUN) HDDs are sometimes tested at the same time, such as when performing various read/write test procedures. Tests would preferably be performed concurrently on all LUNs of a multi-actuator HDD being tested, but prior to this disclosure such methods have not yet been developed. Concurrent testing as described in embodiments herein can improve error or bug capture when all actuators are in use, which minimizing conflicts or collisions on various LUNs either benefitting from a pause in testing or benefitting from another LUN having its respective testing paused during an interruption.

FIG. 1 is a block diagram of a storage system 100 that includes a storage device including at least two logical units, according to various embodiments.

A storage system, such as a storage array, can include one or more storage devices 110. As shown, a single storage device 110 is designated as storage device D0. Storage device 110 can include multiple LUNs 112 and 114, and each LUN can include multiple data blocks to be addressed using, e.g., LBA. In some embodiments, each LUN could include three data blocks that can be used to store data or parity data, but each LUN could include any number of data blocks according to particular implementation and virtual or physical characteristics of each storage device 110, LUN 112/114, etc.

As shown, storage device 110 includes two LUNs 112 and 114, which can be designated as LUN 0 and LUN 1, respectively. Each of LUN 0 and LUN 1 can include one or more data blocks therein, which can be utilized in various embodiments for block-level data striping according to various redundant array of independent disk (RAID) schemes. Although block-level striping is used throughout the present application for simplicity, it is also contemplated that in other embodiments any other data chunk size can alternatively be used, including bit, byte, page, other, or any suitable combination(s) thereof.

Storage device 110 can represent a whole or partial HDD in various embodiments. Furthermore, the logical units 112 and 114 can each correspond to a portion of an HDD that is accessible by an actuator within a multi-actuator HDD.

Turning now to FIGS. 2A and 2B, various existing test suite scheme details are shown, including which LUNs are currently tested in single actuator and multi-actuator HDDs. In particular, FIG. 2A is a table 200 showing which LUNs are tested in a single actuator HDD according to existing schemes. In such existing test schemes, a single LUN 0 is tested. As shown in FIG. 2A, existing test suites are designed to test a single LUN (e.g., LUN 0).

FIG. 2B is a table 202 showing which LUNs are tested in a multi-actuator HDD according to existing schemes. In testing a multi-actuator drive using existing schemes and test suites, when one LUN is tested (e.g., LUN 0), other LUNs (e.g., LUN 1, 2, etc.) are not tested concurrently. Instead, each LUN 0, 1, 2 may be tested sequentially, leading to multiplication of testing time based on the number of LUNs to be tested. In other words, in a case of testing a multi-actuator HDD, the existing test suites are configured to be separately or sequentially run on each LUN of a multi-LUN (i.e., multi-actuator) HDD. This means that for each additional actuator (and therefore each additional LUN) test time would increase by a full test duration of time, thereby multiplying the test duration by the number of actuators/LUNs present in the HDD being tested.

Figure 3A:
FIG. 3A is a table showing which LUNs are tested in a single actuator drive, according to various embodiments of the present disclosure.

FIG. 3A is a table 300 showing which LUNs are tested in a single actuator drive according to various embodiments of the present disclosure. Table 300 of FIG. 3A can be similar to table 200 of FIG. 2A, since only one LUN is present in a single actuator drive.

Figure 3B:
FIG. 3B is a table showing which LUNs are tested in a multi-actuator drive, according to various embodiments of the present disclosure.

FIG. 3B is a table 302 showing which LUNs are tested in a multi-actuator drive according to various embodiments of the present disclosure. According to table 302, and according to embodiments of the present disclosure, a same (or similar or related) test suite can be run concurrently on all LUNs of the multi-actuator HDD. In some cases, the test suites to be run on the LUNs may utilize multi-threaded instances to run the same test on each actuator's LUN concurrently. By utilizing multi-threaded instances, significant increase in test time may be avoided when all LUNs are being tested. Therefore, as shown in table 302, three LUNs (0, 1, and 2) are all tested concurrently instead of sequentially.

Existing test suites tested only one LUN at a time. One reason for this and existing challenge related to concurrent LUN testing is that an interruption on a LUN can occur in the middle of a testing process. Such interruptions can include, for example, a drive resend mode or a page configuration change. For another example, if one of the LUNs performs a reset, all LUNs would be affected. Thus, all threads can be affected by a single LUN (or drive-based) interruptive event during testing. This is undesirable for many reasons.

To prevent these disruptions related to interruptions from occurring, two "sync" functions are introduced in this disclosure: "enter sync( )" (Enter Sync) and "exit sync( )" (Exit Sync). Simplified examples of the "enter sync" and "exit sync" functions are reproduced below.

Enter Sync function: void enterSync( ): Tells other threads to enter sync state and waits for all other threads to give the go-ahead signal.

Exit Sync function: void exitSync( ): Tells other threads that this thread is ready to exit sync and waits for all other threads to give the ready to sync signal.

One purpose of these Enter Sync and Exit Sync functions is to inform other threads that an interruption has occurred. Another purpose is to inform other testing threads that testing is to be paused until the interruptions are cleared. Using these Enter/Exit sync functions, embodiments of the present disclosure can be performed.

Figure 4:
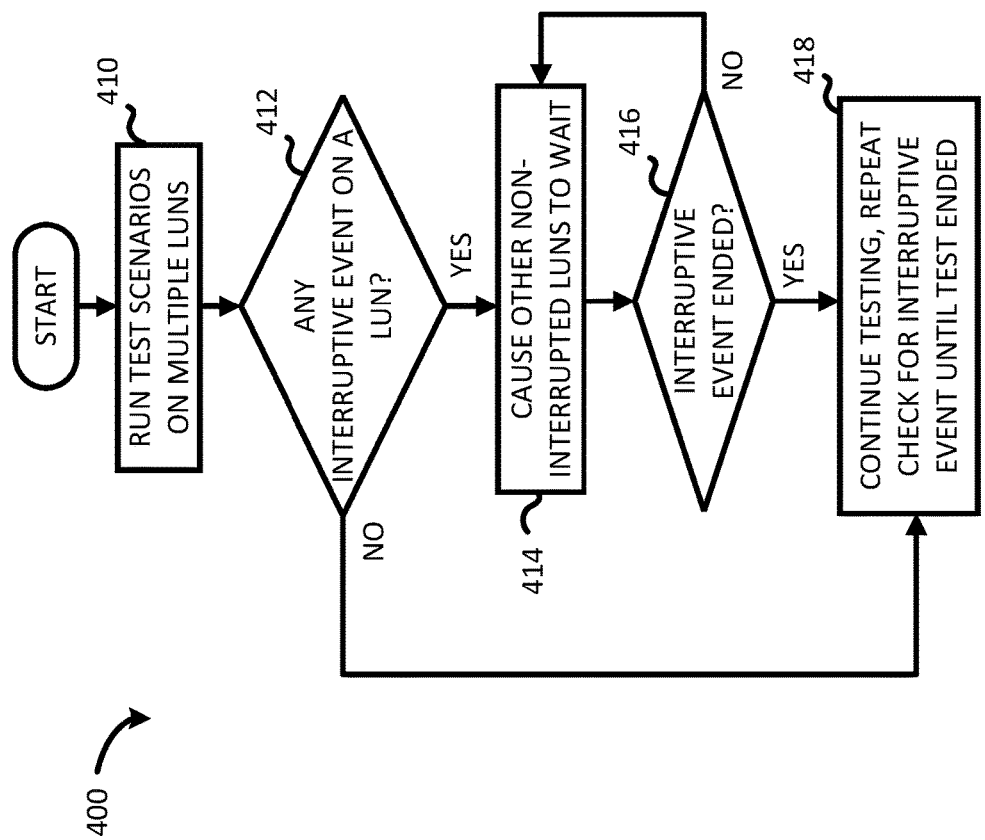
FIG. 4 is a flowchart of an example process for testing a multi-actuator drive, according to various embodiments.

FIG. 4 is a flowchart of an example process 400 for testing a multi-actuator drive, according to various embodiments.

Process 400 is an example process for testing a multiple actuator, multiple LUN HDD. The process 400 can begin by running test scenarios on the multiple LUNs of the multi-actuator HDD at operation 410. Next, at operation 412 it can be determined whether there is an interruptive event on any LUN of the HDD. If it is determined that there is not an interruption on any LUN of the HDD at operation 412, the process can continue to operation 418, and testing can continue of the HDD, including repeating the check for an interruptive event on the HDD until the test process 400 has ended. If, however, it is determined at operation 412 that an interruptive event is detected or otherwise found on one of the LUNs of the HDD, the process 400 can continue to operation 414. At operation 414 after the determination at operation 412 that an interruptive event is detected on one of the LUNs, the other, non-interrupted LUNs can be caused or otherwise instructed to wait. At operation 416, it can then be determined whether the interruptive event detected at operation 412 has ended. If the interruptive event has not ended, the process 400 returns to operation 414. If it is determined that the interruptive event has ended at operation 416, the process 400 can then proceed to operation 418, and testing can continue of the HDD, including repeating the check for an interruptive event on the HDD until the test process 400 has ended.

Interruptive events can be characterized as "LUN-based" or "device based." Some interruptive events are both LUN-based and device-based. Some examples of each type of interruptive events are listed herein.

Figure 5:
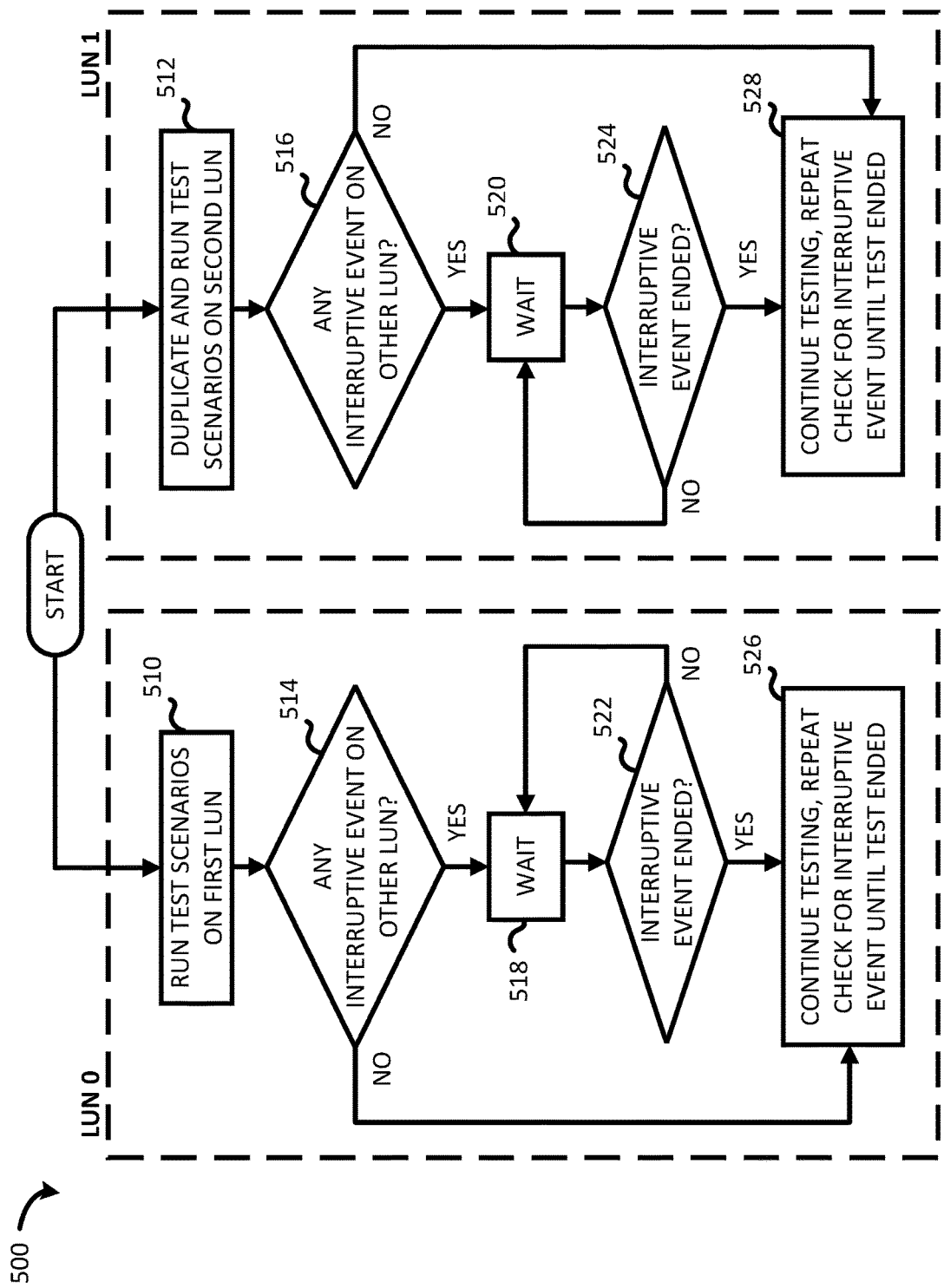
FIG. 5 is a flowchart of another example process for testing a multi-actuator drive, according to various embodiments.

FIG. 5 is a flowchart of another example process 500 for testing a multi-actuator drive, according to various embodiments. The flowchart of process 500 shown at FIG. 5 depicts operations that occur on two example LUNs, LUN 0 and LUN 1. The process 500 can be similar to process 400.

Process 500 can start at operation 510, and test scenarios can be run on a first LUN (LUN 0) at operation 510. At substantially the same time as operation 510 or immediately thereafter, the test scenarios of operation 510 can be duplicated and run as a test on a second LUN (LUN 1) at operation 512. The duplication of the test scenarios of operation 510 to get the test scenarios to be run at operation 512 can include some changes as necessary to apply to testing on the second LUN.

Next, at operations 514 (LUN 0) or 516 (LUN 1), it can be determined whether there is any interruptive event on the other LUN. For example, at operation 514 it can be determined whether there is an interruption on LUN 1, and at operation 516 it can be determined whether there is an interruption on LUN 0. If it is determined at operation 514 that there is an interruption on LUN 1, the process 500 can wait at operation 518. If it is determined at operation 516 that there is an interruption on LUN 0, the process 500 can wait at operation 520.

If and when the process 500 is waiting at operation 518, it can then be determined that the interruptive event on LUN 1 has ended at operation 522. Similarly, if and when the process 500 is waiting at operation 520, it can then be determined that the interruptive event on LUN 0 has ended at operation 524. If it is not determined that the respective interruptive event has ended at operations 522 or 524, the process 500 can return to operation 518 or 520, respectively, and can wait.

If it is determined that the interruptive event has ended at operation 522 or 524, the process 500 can proceed to operation 526 or 528, respectively. At operation 526/528, the process 500 can continue testing on the respective LUN, and can repeat a check for interruptive events on the respective LUN until the testing process 500 ends.

It should be noted that various operations of process 500 that occur on LUN 0 or LUN 1 can take place in various orders and sequences, and corresponding operations on LUN 0 and LUN 1 are not necessarily to be performed simultaneously. In various embodiments, three or more LUNs can perform a process similar to process 500, with the exception that each LUN would check for interruptions on all other LUNs included in a testing process.

Figure 6:
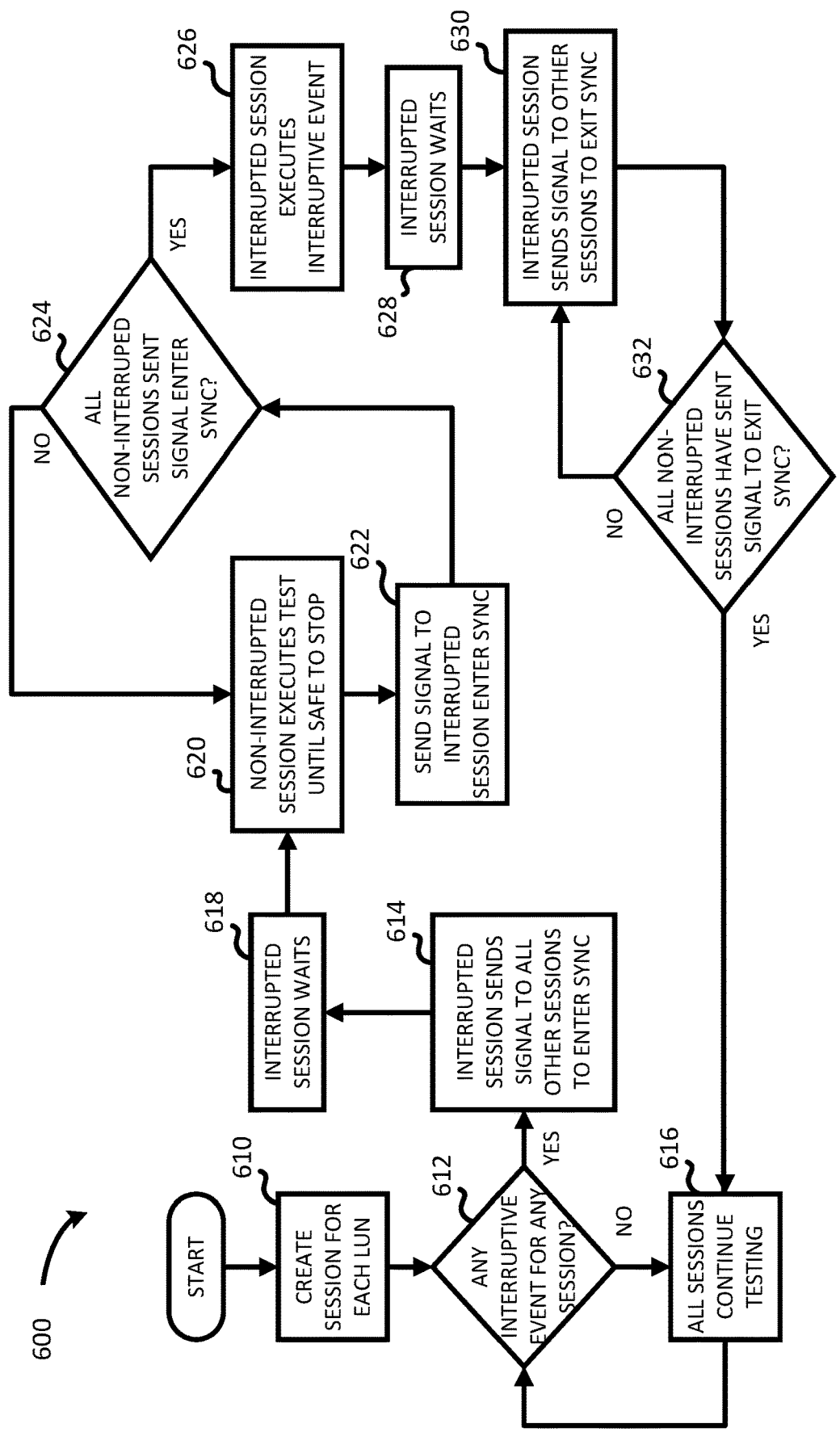
FIG. 6 is a flowchart of yet another example process for testing a multi-actuator drive, according to various embodiments.

FIG. 6 is a flowchart of yet another example process 600 for testing a multi-actuator drive, according to various embodiments.

Test suites for testing each LUN of a multi-actuator HDD can involve multiple sessions and/or threads for testing. According to process 600, a session is created for each LUN of a multi-LUN, multi-actuator HDD at operation 610. Following operation 610 it can be determined whether any interruptive event is present or has been detected for any session corresponding to testing of a LUS at operation 612. If it is determined that there are no interruptive events for any session at operation 612, the process 600 can proceed to operation 616, and all sessions can continue testing until testing is complete.

If at operation 612 it is determined that at least one interruptive event for a session is detected, the process 600 can proceed to operation 614. At operation 614, the interrupted session sends a signal to all other sessions, and indicates to the other sessions to enter sync. Following operation 614, the interrupted session waits at operation 618. While the interrupted session waits at operation 618, one or more non-interrupted session executes testing operations until it is determined that it is safe to stop at operation 620. Following operation 620, a signal is sent to the interrupted session at operation 622, the signal indicating to the interrupted session that it is safe to enter sync.

At operation 624, it is determined whether all non-interrupted sessions have sent a signal that it is safe to enter sync. If it is determined that not all non-interrupted sessions have sent the signal that it is safe to enter sync at operation 625, the process 600 can return to operation 620. If it is determined that all non-interrupted sessions have send a signal that it is safe to enter sync at operation 624, the process can proceed to operation 626. At operation 626, the interrupted session performs, executes, or otherwise resolves the interruptive event. Following operation 626, the interrupted session waits at operation 628. Following operation 628, at operation 630, the interrupted session sends signal to other sessions to exit sync.

Following operation 630, it can be determined at operation 632 whether all non-interrupted sessions have sent the signal that it is safe to exit sync. If it determined at operation 632 that it is not safe to exit sync, the process 600 can return to operation 630. If it is determined that the non-interrupted sessions have send the signal that it is safe to exit sync at operation 632, the process 600 can proceed to operation 616, and all sessions can continue testing until complete unless and until another interruptive event is detected for any session at operation 612.

Figure 7:
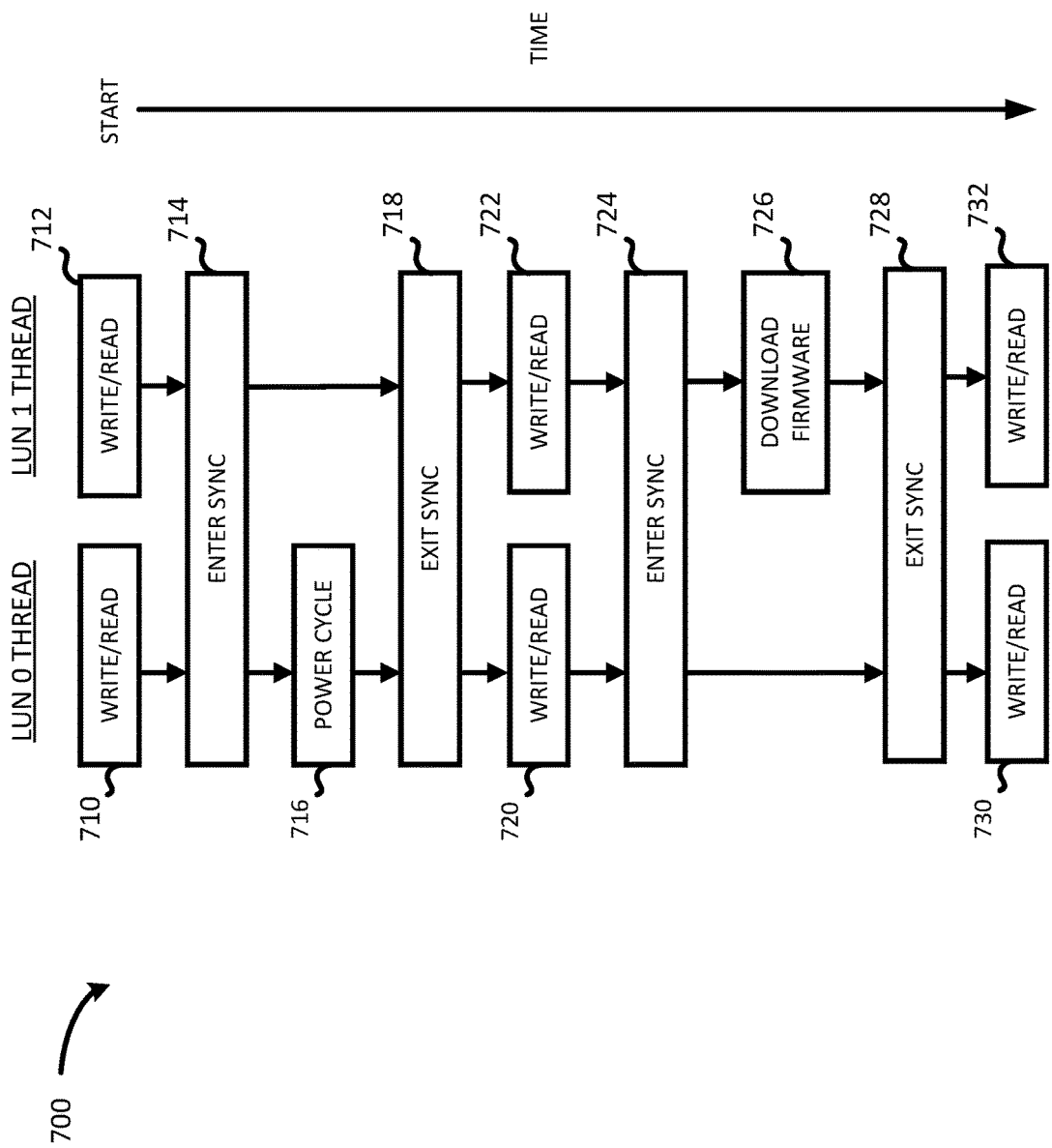
FIG. 7 is a timeline showing operations on multiple LUN threads during a testing process of a multi-actuator drive, according to various embodiments.

FIG. 7 is a timeline 700 showing operations on multiple LUN threads during a testing process of a multi-actuator drive, according to various embodiments.

As shown, two LUN threads (for LUN 0 and LUN 1) are shown, with the LUN 0 thread on the left and the LUN 1 thread on the right. Also as shown, testing timeline 700 proceeds chronologically from top to bottom. Therefore, timeline 700 as shown starts with a write/read operation 710 on LUN 0 thread, and write/read operation 712 on the LUN 1 thread. The write/read operations, including operations 710 and 712, are LUN-based events, and can be classified as "non-interruptive" type events. Operations 710 and 712 can occur substantially at the same time, but in any event operations 710 and 712 halt when both threads enter sync at operation 714. The threads can enter sync at operation as a result of a determined interruption on one of the threads. For example, an interruptive event may be detected on the thread for LUN 0, causing both threads to enter sync as LUN 0 thread power cycles at operation 716 to resolve the interruptive event. Operation 716 (and 726, below) can be classified as drive-based, interruptive events, herein. Once the power cycle operation 716 is complete, both threads can exit sync at operation 718 and resume write/read (e.g., testing) operations 720, and 722 for LUN 0 and LUN 1, respectively. The LUN 1 thread during power cycle operation 716 of the LUN 0 thread can represent a pause in the testing of the LUN 1 thread.

If another interruptive event is detected on LUN 0 or LUN 1, the threads for LUN 0 and LUN 1 can again enter sync and pause LUN-based events at operation 724. In one example, a firmware update may be necessary on LUN 1, and the LUN 1 thread can download and update the firmware on LUN 1 at operation 726 while LUN 0 thread is paused. Once download firmware operation 726 is complete, the LUN 0 and LUN 1 threads can exit sync at operation 728, and continue performing write/read (e.g., testing) operations at operations 730 and 732, respectively.

Various interruptive events are contemplated that can necessitate entering and exiting sync in order to avoid conflicts and collisions during testing. Although a power cycle operation 716 and a download firmware operation 726 are shown as occurring when all threads have entered sync, any suitable operation can be performed when the threads have entered sync, and more than one operation can occur in some cases when the threads have entered sync.

Figure 8:
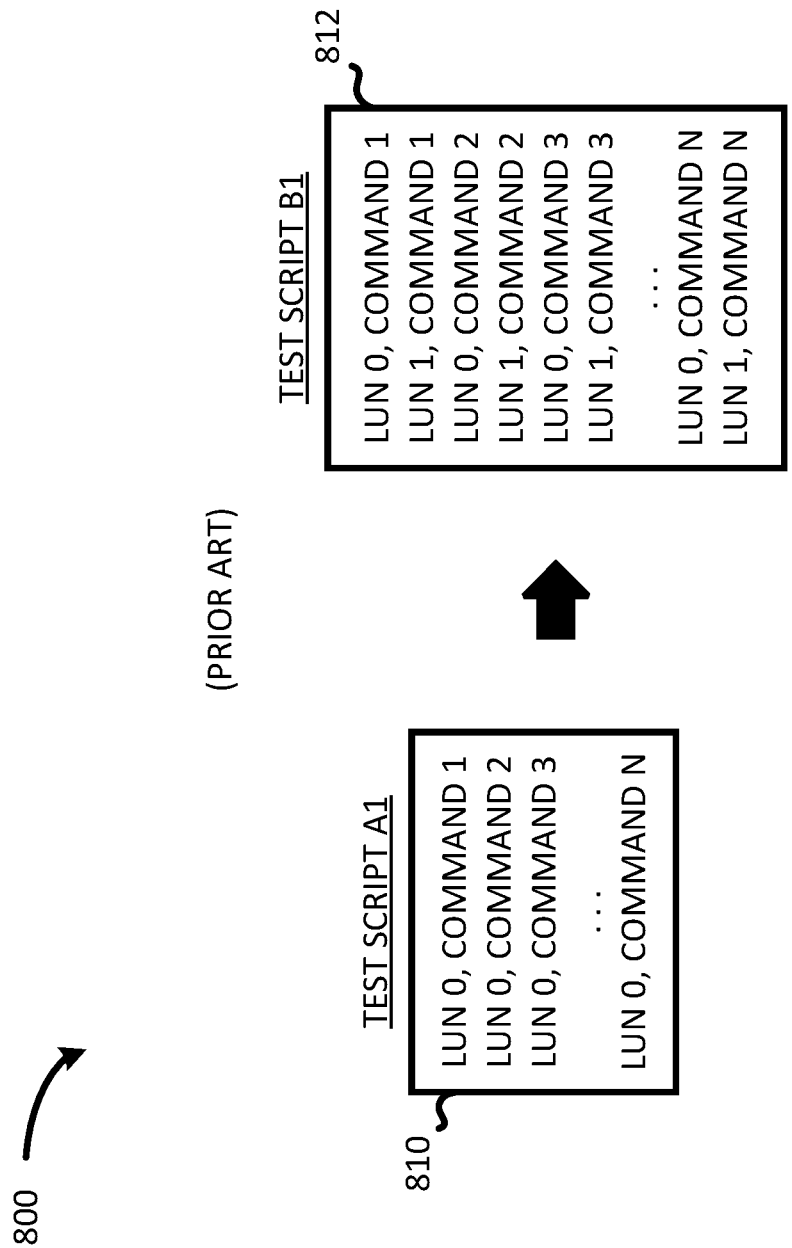
FIG. 8 shows test scripts for single session testing for multi-actuator drives, according to existing schemes.

FIG. 8 shows test scripts 800 for single session testing for multi-actuator drives, according to existing schemes.

An existing test script A1 for a single actuator, single LUN drive is shown at 810. According to test script A1, the test script includes N commands to be performed sequentially on the LUN 0. In order to convert test script A1 (810) to a test script B1 (812) to be performed on a multi-actuator, multi-LUN drive, the N commands are performed in an alternating, but sequential manner, where a first command is performed on LUN 0, and the first command is then performed on LUN 1, and so forth. Therefore, as shown in test script B1 (812), for commands 1 through N, the commands are performed in pairs for the two LUNs, for a total of 2N commands. This is an example of an existing scheme where testing two LUNs can take approximately twice as much time as testing a single LUN of a drive.

Figure 9:
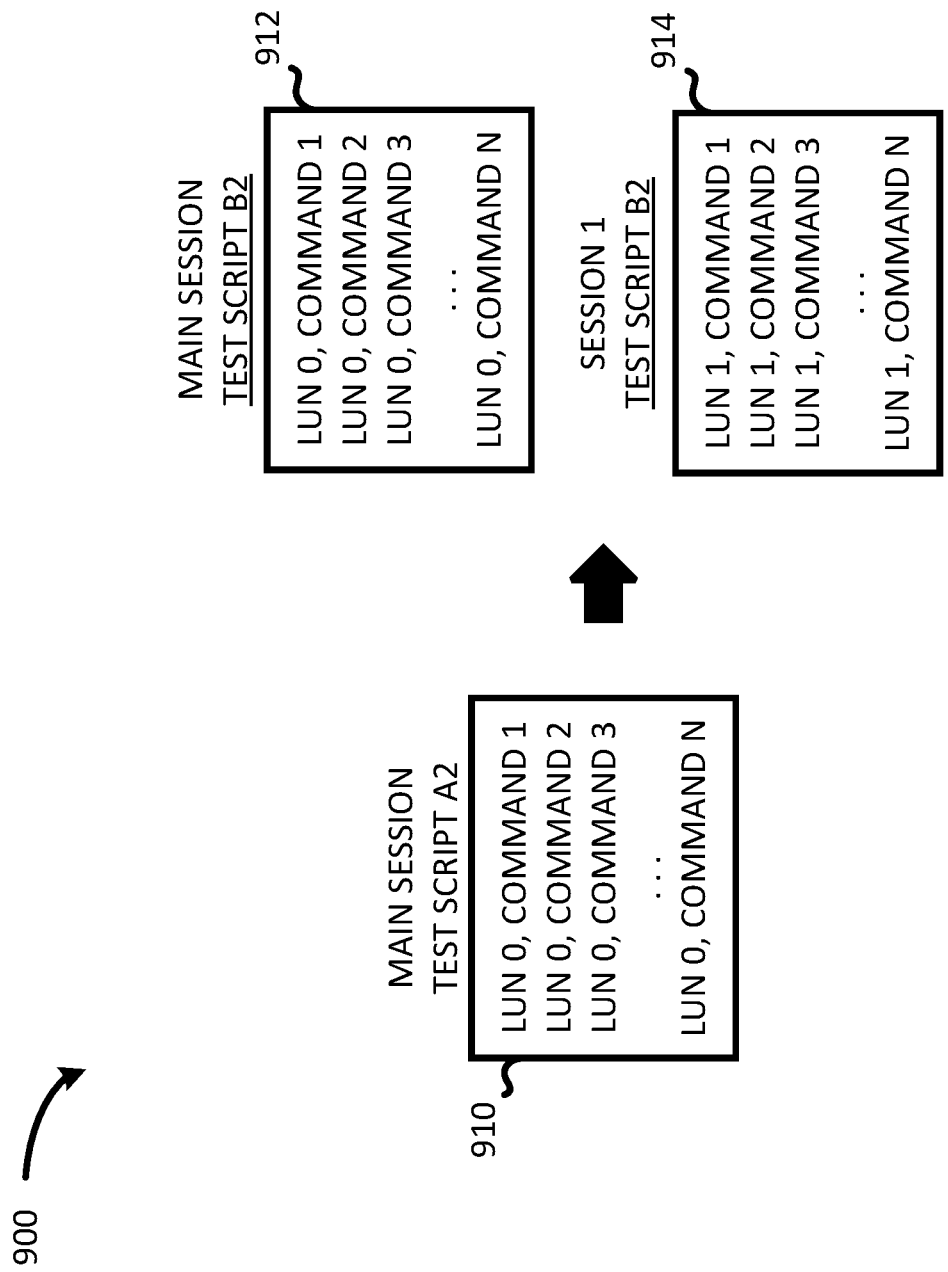
FIG. 9 shows test scripts for multi session testing for multi-actuator drives, according to various embodiments.

FIG. 9 shows test scripts for multi session testing for multi-actuator drives, according to various embodiments. According to FIG. 9, an improved testing scheme using multiple testing sessions and multiple copies of a test script to improve testing performance and reduce testing time for multi-actuator drives is shown.

At 910, an example test script A2 is shown, which as shown is configured to be performed on a single actuator single LUN drive. Test script A2 (910) includes N commands to be performed on a single LUN.

At 912 and 914, two copies of a test script B2 are shown, where the first copy of test script B2 (912) is assigned to LUN 0, and the second copy of test script B2 (914) is assigned to LUN 1. Test scripts B2, 912 and 914 include the same set of commands 1-N, but are performed as a "main" session and a "session 1" separate from the main session. Therefore, and according to embodiments described herein, the test script B2 is duplicated and performed concurrently on LUN 0 and LUN 1.

Figure 10:
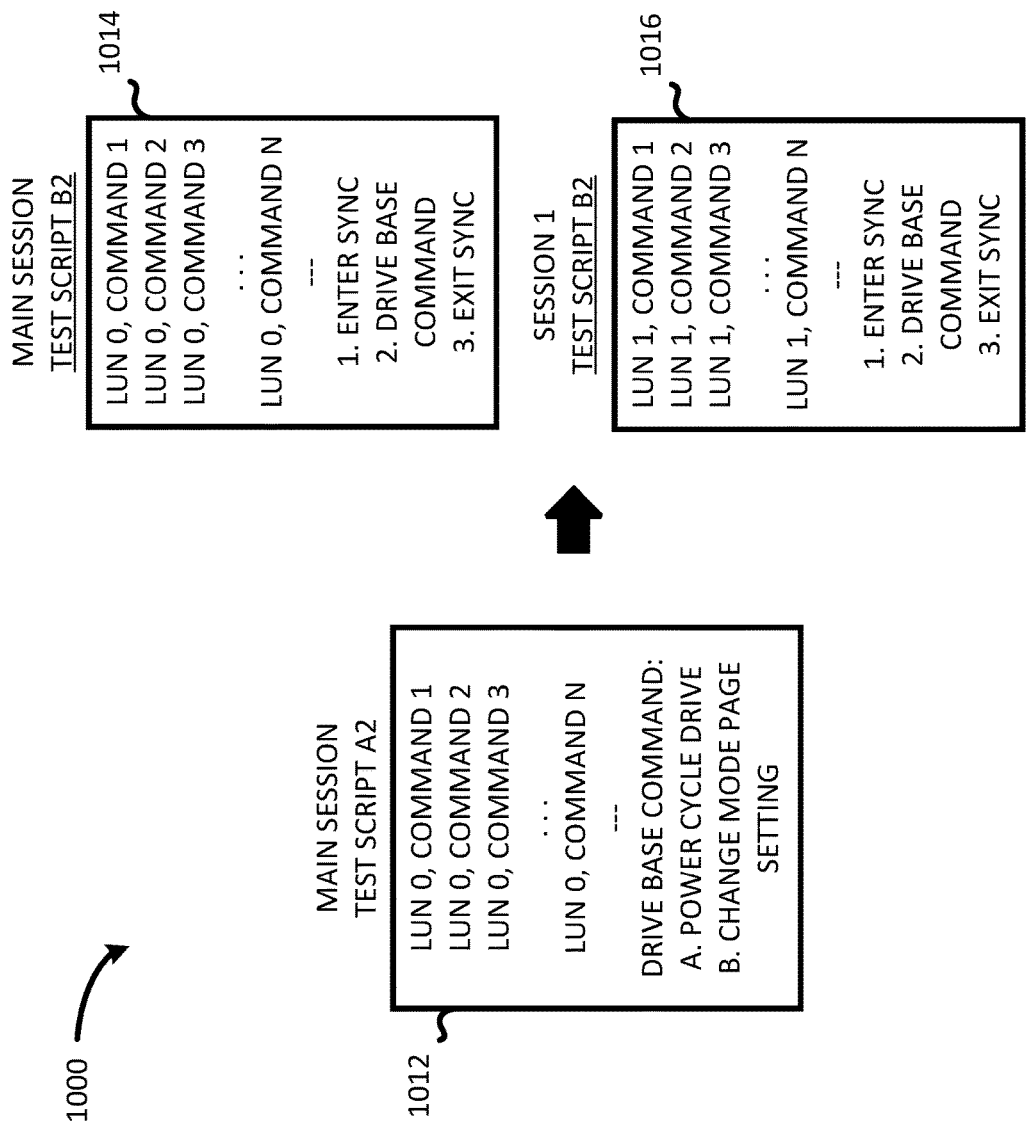
FIG. 10 shows test scripts for multi session testing with synchronization details for multi-actuator drives, according to various embodiments.

FIG. 10 shows test scripts 1000 for multi session testing with synchronization details for multi-actuator drives, according to various embodiments. FIG. 10 is similar to FIG. 9, but add synchronization and interruptive details. Test script A2 (1012) is similar to test script A2 (912) of FIG. 9. Also, test scripts B2 (1014, 1016) are similar to test scripts B2 (914, 916) of FIG. 9.

FIG. 10 provides further details to the test scripts. In particular, test script A2 (1012) is provided with drive base commands, including A. power cycle drive, and B. change mode page setting. These drive base commands can be performed when the testing of LUN 0 and LUN have entered sync at test scripts B2 (1014, 1016). In particular, either/both of LUN 0 (main session), or LUN 1 (session 1) can 1. enter sync, 2. perform a base command, and 3. exit sync once the base command is performed (e.g., following a related interruptive event).

Figure 11:
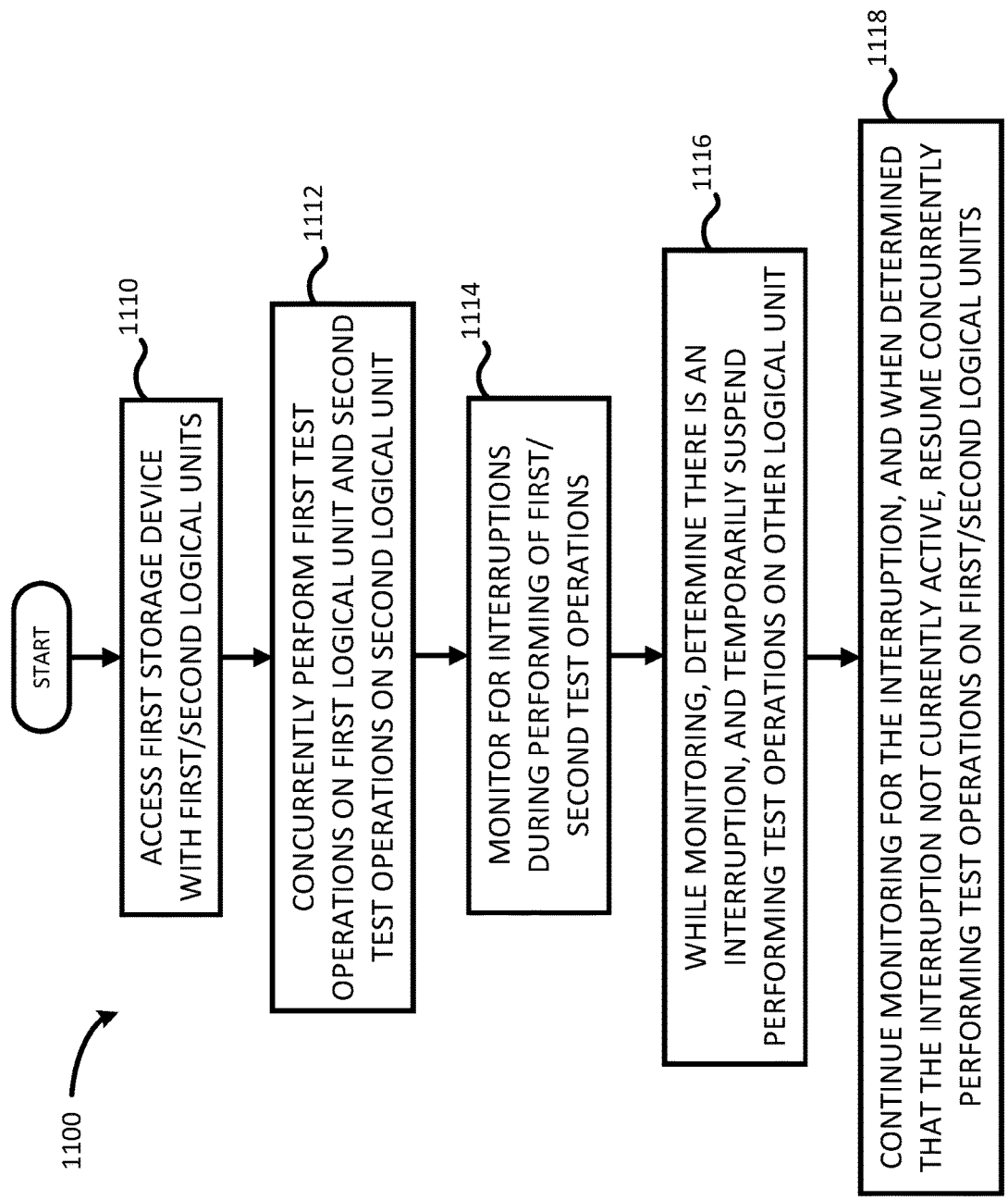
FIG. 11 is a flowchart of still yet another example process for testing a multi-actuator drive, according to various embodiments.

FIG. 11 is a flowchart of still yet another example process 1100 for testing a multi-actuator drive, according to various embodiments.

Process 1100 can begin at operation 1110, and a first storage device with first and second logical units (LUNs) thereon can be accessed. The process 1100 can then proceed to operation 1112.

At operation 1112, a first group of test operations are performed on a first logical unit concurrently with a second group of test operations performed on a second logical unit. The process 1100 can then proceed to operation 1114. The second group of test operations can be based at least in part on the first group of test operations, and in some embodiments can be substantially the same as the first group of test operations.

At operation 1114, the first logical unit and the second logical unit are monitored for interruptions during the performing the first and second groups of test operations. The process 1100 can then proceed to operation 1116.

At operation 1116, while monitoring, it can be determined that there is an interruption, and performing the test operations on the other logical unit can be temporarily suspended or paused. The process 1100 can then proceed to operation 1118. According to some embodiments, the interruption can be a device-based interruption. In further embodiments, the device-based interruption can relate to a drive reset or mode page configuration change.

At operation 1118, monitoring for the interruption can continue, and when it is determined that the interruption is not currently active, concurrently performing the test operations can resume on the first and second logical units. The process 1110, or any operations thereof, can then repeat in part or in whole.

According to various embodiments, suspending performing the respective test operations can correspond to an enter sync operation, and resuming performing the respective test operations can correspond to an exit sync operation. In yet further embodiments, the interruption can be resolved after the enter sync operation and before the exit sync operation.

Figure 12:
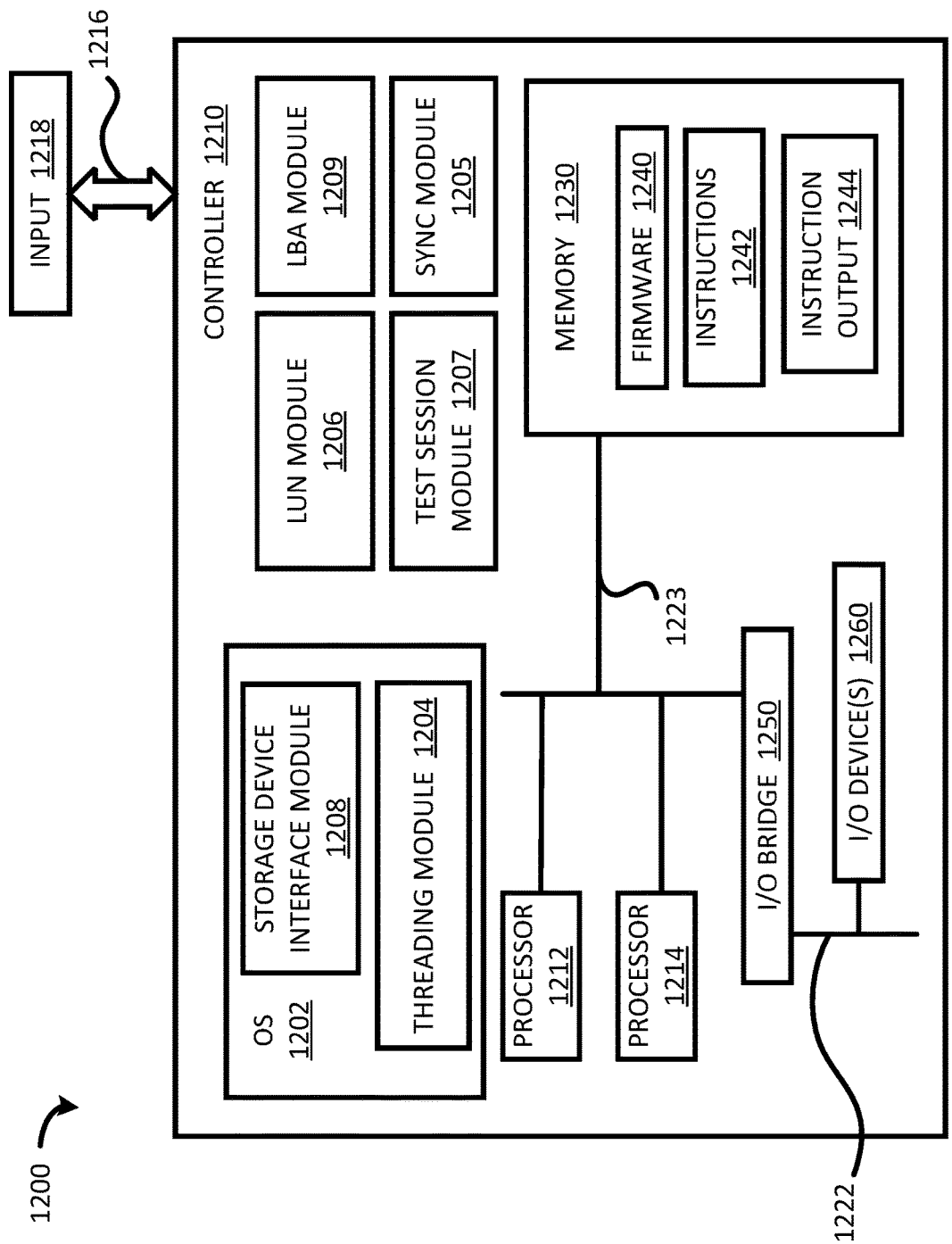
FIG. 12 is a block schematic diagram of a computer system according to embodiments of the present disclosure.

FIG. 12 is a block schematic diagram of a computer system 1200 according to embodiments of the present disclosure.

Computer system 1200, as shown, is configured with an interface 1216 to enable controller 1210 to receive a request to test a multi-actuator HDD, as described in particular with regard to FIGS. 1-11. An input 1218 may be received at interface 1216. In embodiments, the interface 1216 can enable controller 1210 to receive, or otherwise access, the input 1218 via, for example, a network (e.g., an intranet, or a public network such as the Internet), or a storage medium, such as a disk drive internal or connected to controller 1210. The interface can be configured for human input or other input devices, such as described later in regard to components of controller 1210. It would be apparent to one of skill in the art that the interface can be any of a variety of interface types or mechanisms suitable for a computer, or a program operating in a computer, to receive or otherwise access or receive a source input or file.

Processors 1212, 1214 included in controller 1210 are connected by a memory interface 1220 to memory device or module 1230. In embodiments, the memory 1230 can be a cache memory, a main memory, a flash memory, or a combination of these or other varieties of electronic devices capable of storing information and, optionally, making the information, or locations storing the information within the memory 1230, accessible to a processor. Memory 1230 can be formed of a single electronic (or, in some embodiments, other technologies such as optical) module or can be formed of a plurality of memory devices. Memory 1230, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 1200 can include a plurality of memory devices. A memory interface, such as 1220, between a one or more processors and one or more memory devices can be, for example, a memory bus common to one or more processors and one or more memory devices. In some embodiments, a memory interface, such as 1220, between a processor (e.g., 1212, 1214) and a memory 1230 can be point to point connection between the processor and the memory, and each processor in the computer 1200 can have a point-to-point connection to each of one or more of the memory devices. In other embodiments, a processor (for example, 1212) can be connected to a memory (e.g., memory 1230) by means of a connection (not shown) to another processor (e.g., 1214) connected to the memory (e.g., 1223 from processor 1214 to memory 1230).

Computer 1200 can include an input/output (I/O) bridge 1250, which can be connected to a memory interface 1220, or to processors 1212, 1214. An I/O bridge 1250 can interface the processors 1212, 1214 and/or memory devices 1230 of the computer 1200 (or, other I/O devices) to I/O devices 1260 connected to the bridge 1250. For example, controller 1210 includes I/O bridge 1250 interfacing memory interface 1222 to I/O devices, such as I/O device 1260. In some embodiments, an I/O bridge 1250 can connect directly to a processor or a memory, or can be a component included in a processor or a memory. An I/O bridge 1250 can be, for example, a peripheral component interconnect express (PCI-Express) or other I/O bus bridge, or can be an I/O adapter.

An I/O bridge 1250 can connect to I/O devices 1260 by means of an I/O interface, or I/O bus, such as I/O bus 1222 of controller 1210. For example, I/O bus 1222 can be a PCI-Express or other I/O bus. I/O devices 1260 can be any of a variety of peripheral I/O devices or I/O adapters connecting to peripheral I/O devices. For example, I/O device 1260 can be a graphics card, keyboard, mouse, stylus, gesture control sensor, or other input device, a hard-disk drive (HDD), solid-state drive (SSD) or other storage device, a network interface card (NIC), etc. I/O devices 1260 can include an I/O adapter, such as a PCI-Express adapter, that connects components (e.g., processors or memory devices) of the computer 1200 to various I/O devices 1260 (e.g., disk drives, Ethernet networks, video displays, keyboards, mice, styli, sensors, touchscreens, etc.).

Computer 1200 can include instructions executable by one or more of the processors 1212, 1214 (or, processing elements, such as threads of a processor). The instructions can be a component of one or more programs. The programs, or the instructions, can be stored in, and/or utilize, one or more memory devices of computer 1200. As illustrated in the example of FIG. 12, controller 1210 includes a plurality of programs or modules, such as LUN module 1206, test session module 1207, LBA module 1209, and sync module 1205. A program can be, for example, an application program, an operating system (OS) or a function of an OS, or a utility or built-in function of the computer 1200. A program can be a hypervisor, and the hypervisor can, for example, manage sharing resources of the computer 1200 (e.g., a processor or regions of a memory, or access to an I/O device) among a plurality of programs or OSes.

Programs can be "stand-alone" programs that execute on processors and use memory within the computer 1200 directly, without requiring another program to control their execution or their use of resources of the computer 1200. For example, controller 1210 includes (optionally) stand-alone programs in LUN module 1206, test session module 1207, LBA module 1209, and sync module 1205. A stand-alone program can perform particular functions within the computer 1200, such as controlling, or interfacing (e.g., access by other programs) an I/O interface or I/O device. A stand-alone program can, for example, manage the operation, or access to, a memory (e.g., memory 1230). A basic I/O subsystem (BIOS), or a computer boot program (e.g., a program that can load and initiate execution of other programs) can be a standalone program.

Controller 1210 within computer 1200 can include one or more OS 1202, and an OS 1202 can control the execution of other programs such as, for example, to start or stop a program, or to manage resources of the computer 1200 used by a program. For example, controller 1210 includes OS 1202, which can include, or manage execution of, one or more programs, such as OS 1202 including (or, managing) storage device interface module 1208, and threading module 1204. In some embodiments, an OS 1202 can function as a hypervisor.

A program can be embodied as firmware (e.g., BIOS in a desktop computer, or a hypervisor) and the firmware can execute on one or more processors and, optionally, can use memory, included in the computer 1200. Firmware can be stored in a memory (e.g., a flash memory) of the computer 1200. For example, controller 1210 includes firmware 1240 stored in memory 1230. In other embodiments, firmware can be embodied as instructions (e.g., comprising a computer program product) on a storage medium (e.g., a CD-ROM, DVD-ROM, flash memory, or disk drive), and the computer 1200 can access the instructions from the storage medium.

In embodiments of the present disclosure, computer 1200 can include instructions for PCB testing and/or manufacturing. Controller 1210 includes, for example, LUN module 1206, test session module 1207, LBA module 1209, and sync module 1205, which can be useful for performing testing of multi-actuator, multi-LUN HDDs.

The example computer system 1200 and controller 1210 are not intended to limiting to embodiments. In embodiments, computer system 1200 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, controller 1210 can be, for example, a computing device having a processor (e.g., 1212) capable of executing computing instructions and, optionally, a memory 1230 in communication with the processor. For example, controller 1210 can be a desktop or laptop computer; a tablet computer, mobile computing device, personal digital assistant (PDA), or cellular phone; or, a server computer, a high-performance computer (HPC), or a super computer. Controller 1210 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

Applicant's Test Results:

In testing by Applicant, it has been shown that it takes only three weeks to complete all test conversion using embodiments of the present disclosure. In contrast, before the present disclosure was conceived, it was estimated that the test conversion would have instead taken 4-6 months to make changes to test suites to cater to multi-actuator HDDs. Also, after the conversion, it is further found that the test time for a multi-actuator HDD under the present disclosure is not substantially longer than on a single actuator HDD. The fewer code changes needed to existing test suites also beneficially leads to the introduction of fewer bugs during testing. Therefore, various code maintenance is also minimized. Beneficially, less human and machine time is therefore required, saving time and effort compared to creating an entirely new test suite.

Application to HDD Firmware

Part of the mechanism of syncing LUN testing sessions can also be potentially used in HDD firmware. For example, while one LUN is in the process of executing queued commands and a mode select is sent to another LUN, the HDD controller waits for a set maximum of time (e.g., of vendor specific command time out) for the other LUN(s) to complete their commands before doing the mode select. If other LUN commands are not completed within a time frame, then the mode select can be aborted with a new check condition. However, in some cases the above may not be applicable with regards to some interruptive events like power cycle or bus reset.

Downloading firmware, a sanitize function, mode select, start/stop, etc. can affect an entire device, including both LUNs. When one thread is to do something that would affect the other, it enters sync and waits until the other thread send a "go" flag to it. The "go" flag can be sent from either function of "enter sync" or "exit sync." Described test scripts can be intelligent enough to wait and go without abruptly interrupting the LUNs' operation while both LUNs are currently busy.

Selected examples of drive-based, interruptive "Device" events and LUN-based, non-interruptive "LUN" events:

TEST_UNIT_CMD (Device): The drive will return a "good" status only if both LUNs can service medium access commands.

REZERO_CMD (Device): The command will force the seek to LBA 0 on both LUNs. The thermal compensation and other actions are also taken at both LUNs (actuators).

FORMAT_CMD (Device): The format parameters are applied to both LUN's. The format operation is done in parallel on the two LUN's. Thus format for a 16 TB dual LUN drive with 8 TB at each LUN will take approximately half the time of a 16 TB single LUN drive. Format with defect list may not be supported for a multi-LUN drive.

INQUIRY_CMD (Device): The same information is returned for the Inquiry command regardless of LUN setting. Each LUN has different identifier, which shows up in some INQUIRY fields.

MODE_SEL_CMD (Device/LUN): Single set of mode page parameters are supported for the two LUNs. Only the "Number of Blocks" in the Block Descriptor may be different for the two LUNs. The option to set the capacity for any LUN is not supported. If sector size is changed it may impact both LUNs.

MODE_SENSE_CMD (Device/LUN): Capacity on each LUN can be different and so the "Number of Blocks" in the Block Descriptor may be different for the two LUNs.

START_STOP_CMD (Device). The command can apply to both actuators, and it will cause both actuators to be either spin down or spin-up depending on the command options. If the command fails on either actuator check condition is returned.

SEND_DIAG_CMD (Device/LUN): The device will perform the diagnostic operations (self-test) on both the LUNs. The "translate address" operation is performed on the specified LUN.

SYNC_CACHE_CMD (Device). This will be a device command and only support the option to flush the entire cache. The drive does not support the flush of a particular LBA range only.

READ_DEF_CMD (Device). Device-based defect list is returned; this will include the defects from both the LUNs.

WRITE_BUF_CMD (Device): There is only one common buffer for the two LUNs.

WRITE_BUF_CMD Download (Device): As part of the download the code on both the LUN's will be updated.

READ_BUF_CMD (Device): There is only one common buffer for the two LUNs.

CHANGE_DEF_CMD (Device); Customer unique.

SANITIZE_CMD Overwrite (Device): Sanitize operation performed on both LUNs when command received.

SANITIZE_CMD Security Erase (Device): Sanitize operation performed on both LUNs when command received.

SANITIZE_CMD exit failure mode (Device).

LOG_SEL_CMD (Device): One global set of log pages for both LUNs. Any LBA information is stored as an internal LBA value. This internal LBA value may be encoded to more easily determine LBA to LUN mapping (e.g. encode the LUN in a MSB of the LBA field).

LOG_SENSE_CMD (Device): One global set of log pages for both LUNs. Any LBA information is stored as an internal LBA value. This internal LBA value may be encoded to more easily determine LBA to LUN mapping (e.g. encode the LUN in a MSB of the LBA field).

MODE_SEL_10_CMD (Device): Same as Mode select.

MODE_SENSE_10_CMD (Device): Same as Mode sense.

SYNC_CACHE_16_CMD (Device): Same as Sync Cache.

READ_BUF_16_CMD (Device): Same as Read Buffer.

BACKGROUND CONTROL (Device).

GET PHYSICAL ELEMENT STATUS (Device).

REMOVE ELEMENT AND TRUNCATE (Device).

REPORT_LUNS_CMD (Device): Returns information on the two/multiple LUNs supported by the drive.

TRUSTED_IN (Device).

REPORT SUPPORTED OP CODES (Device).

REPORT SUPPORTED TMFS (Device).

REPORT TIMESTAMP (Device).

REMOVE I_T NEXUS (Device): Removes initiator from both LUNs on single port

READ_DEF_12_CMD (Device): Same as Read Defect.

TRUSTED_IN_ALT_CMD (Device).

PROG_DRIVE_PARM_CMD (Device): Customer unique.

BRANDING_CTL_CMD (Device): Customer unique.

Various commands above can further be classified as follows:

LUN: 1. Unique handling based on LUN field in the command; information/status returned could be different depending on LUN; the command only affects the addressed logical unit; or 2. A mapped logical unit (MLU) field indicates that the command only operates on the logical unit the command is addressed to, but the other logical unit doesn't process new commands until that command completes.

Device: 1. The multiple LUNs are considered a single device. The parameters are applied to all LUNs (e.g., mode select) and/or common information is returned regardless of the LUN setting; or 2. Command affects all of the logical units attached to this SCSI target device and the command operation is interlocked, and in some cases must be sent to both logical units before the operation of the command starts.

It is understood that numerous variations of HDD testing systems and methods could be made while maintaining the overall inventive design of various components thereof and remaining within the scope of the disclosure. Numerous alternate design or element features have been mentioned above.

The foregoing specific embodiments of the present invention as set forth in the specification herein are for illustrative purposes only. Various deviations and modifications may be made within the spirit and scope of the invention without departing from the main theme thereof.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the invention, it is understood that the features are interchangeable between embodiments to arrive at improved multi-actuator HDD testing schemes and method that includes features of different illustrated embodiments.

What is claimed is:

1. A testing stem, comprising:
    a hardware processor operatively coupled to a memory, the memory storing instructions that when executed on the hardware processor generate a storage device unit, a testing unit, and a monitoring unit;
    the storage device unit configured to interface with a first storage device of one or more multiple-actuator storage devices, the first storage device comprising at least a first and a second logical unit stored therein,
    the testing unit comprising a first group of test operations to be performed on the first logical unit and a second group of test operations to be performed on the second logical unit,
    the monitoring unit configured to determine if an interruption occurs while the group of test operations are performed on the first or the second logical unit,
    if the monitoring unit determines that there is an interruption, the testing unit temporarily suspends performing the respective test operations on the other logical unit, and the monitoring unit continues to monitor for interruptions, and
    if it is determined that a group of test operation is not currently interrupted, the testing unit proceeding to perform the respective test operations on the first and second logical units.

2. The system of claim 1, further comprising a connection unit, wherein the connection unit is configured to operatively couple the testing unit to at least one multiple-actuator storage device.

3. The system of claim 1, wherein the respective test operations on the first and second logical units are performed concurrently.

4. The system of claim 1, wherein the monitoring unit is operatively coupled to the testing unit.

5. The system of claim 1, wherein the interruption is a device-based interruption.

6. The system of claim 5, wherein the device-based interruption is a drive reset or a mode page configuration change.

7. The system of claim 1, wherein the testing unit suspending testing corresponds to an enter sync operation, and the testing unit resuming testing corresponds to an exit sync operation.

8. The system of claim 7, wherein the interruption is resolved after the enter sync operation and before the exit sync operation.

9. The system of claim 1, wherein the storage device unit is configured to interface with at least a second storage device of the one or more multiple-actuator storage devices.

10. A method for testing a multiple-actuator storage device, comprising:
    accessing a first storage device of a group comprising at least one storage device, the first storage device comprising at least a first and a second logical unit stored therein;
    concurrently performing a first group of test operations on the first logical unit and a second group of test operations on the second logical unit;
    monitoring for an interruption during the performing the group of test operations on either the first or the second logical unit;
    during the monitoring, if it is determined that there is currently an interruption on one of the first or second logical units, temporarily suspending performing the respective test operations on the other logical unit; and
    continuing to monitor for the interruption, and upon determining that the interruption is not currently active, resuming concurrently performing the test operations on the first and second logical units according to the respective groups of test operations.

11. The method of claim 10, wherein the second group of test operations is based at least in part on the first group of test operations.

12. The method of claim 11, wherein the second group of test operations is substantially the same as the first group of test operations.

13. The method of claim 10, wherein the interruption is a device-based interruption.

14. The method of claim 13, wherein the device-based interruption is related to a drive reset or a mode page configuration change.

15. The method of claim 10, wherein suspending performing the respective test operations corresponds to an enter sync operation, and resuming performing the respective test operations corresponds to an exit sync operation.

16. The method of claim 15, wherein the interruption is resolved after the enter sync operation and before the exit sync operation.

17. A method for testing a multiple-actuator storage device, comprising:
    accessing a first storage device comprising at least a first and a second logical unit stored therein;
    concurrently performing a first group of test operations on the first logical unit and a second group of test operations on the second logical unit;
    determining that there is currently an interruption during the performing the group of test operations on either the first or the second logical unit;
    in response to the determining that there is currently an interruption, temporarily suspending performing the respective test operations on the other logical unit; and
    receiving a resume indication, and resuming concurrently performing the test operations on the first and second logical units according to the respective groups of test operations.

18. The method of claim 17, wherein the second group of test operations is based at least in part on the first group of test operations.

19. The method of claim 18, wherein the second group of test operations is substantially the same as the first group of test operations.

20. The method of claim 17, wherein the interruption is a device-based interruption.

* * * * *